A. T. STURDEVANT.
Improvement in the Manufacture of Paper-Stock.
No. 129,185.  Patented July 16, 1872.
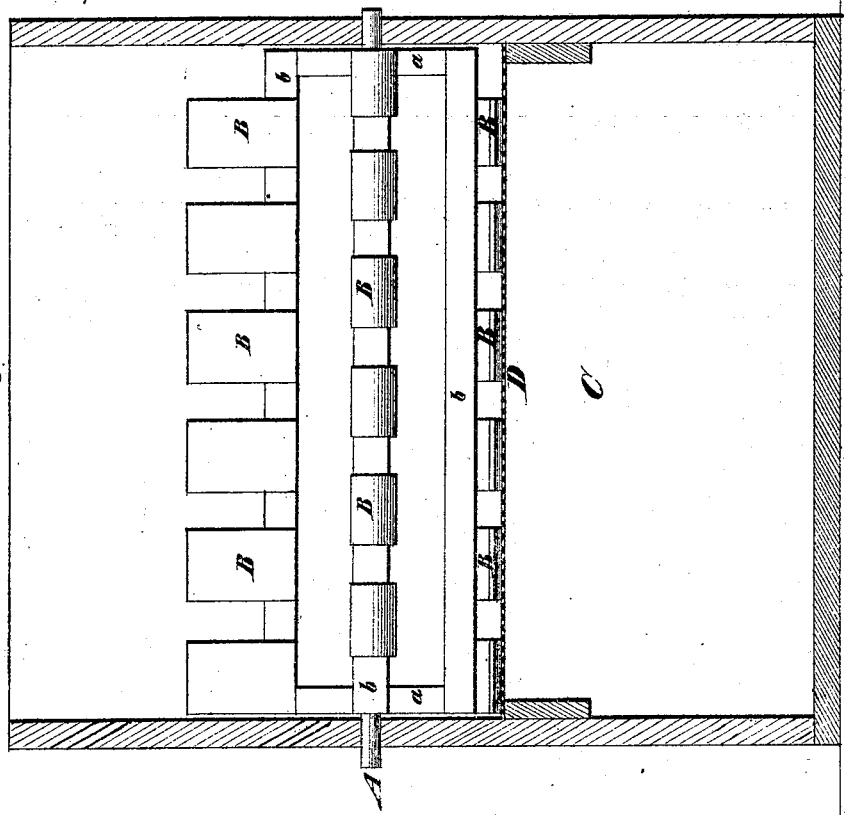
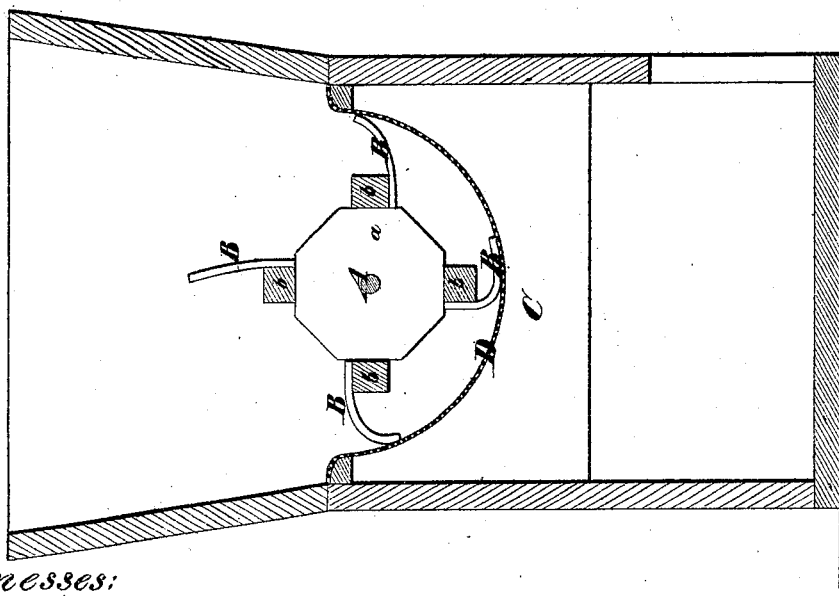
Witnesses:
Henry T. Brown
Fred Haynes
Alfred T. Sturdevant 129,185

UNITED STATES PATENT OFFICE.

ALFRED T. STURDEVANT, OF SCIPIO CENTER, NEW YORK.

IMPROVEMENT IN THE MANUFACTURE OF PAPER-STOCK.

Specification forming part of Letters Patent No. 129,185, dated July 16, 1872.

Specification describing an Improved Process of Reducing Wood Shavings or Cuttings to a Fibrous Condition for Paper-Stock, the invention of ALFRED T. STURDEVANT, of Scipio Center, in the county of Cayuga and State of New York.

This process consists in reducing wood shavings or cuttings to a fibrous condition for paper-stock by rubbing them through a wire-gauze screen or other reticulated or perforated medium.

The machine which I prefer to use in carrying out my invention consists of a series of India rubber or other elastic rubbers or brushes secured to a revolving shaft, in combination with an arc-shaped screen of reticulated or perforated material, of which machine—

Figure 1 of the accompanying drawing is a transverse section, and Fig. 2 is a longitudinal section.

A is the revolving shaft, which has arranged on it hubs a a, secured to which are bars b b, which are parallel with the shaft, and to which are secured at regular intervals apart the India rubber or other elastic rubbers, B B. The said shaft is supported in bearings in a case, C, whose upper portion forms a hopper, and in which, in suitable relation to the shaft A, is arranged the inverted arc-formed screen D, which, as before stated, may be of wire-gauze or other reticulated or perforated material. That portion of the case C below the screen forms a receptacle for the reduced fibers.

The shavings or cuttings may be prepared in various ways, but I prefer to use for the purpose a machine for which Letters Patent No. 122,581 were granted to Hezekiah Dodge, January 10, 1872, and which consists essentially of rings, taper plates, and blades arranged obliquely to the axis of the head, so as to cut around the log at a taper. The shavings thus produced being cut oblique to the grain of the wood have their fibers short, and are easily disintegrated and reduced to a fine fibrous condition suitable for paper-stock.

The shavings or cuttings are introduced into the hopper and fall into the screen D, and the shaft A being rotated by suitable means, its attached elastic rubbers B B rub the cuttings firmly against the screen, and the interstices or perforations of the latter separate the fibers of the wood from one another, and enable them to pass said interstices or perforations.

Generally the cuttings or their fibers will be forced successively through several screens of different degrees of fineness until they are reduced to the requisite fineness.

Brushes made of short stout bristles may be substituted for the India-rubber rubbers B B.

Claims.

1. The process of reducing wood-shavings to a fibrous condition for paper-stock, by rubbing them through a wire-gauze screen or reticulated or perforated medium, substantially as herein described.

2. The disintegration of the wood-shavings into fibers by means of a combination of rotary elastic rubbing devices, and a screen or reticulated or perforated medium of circular or partly circular form, substantially as herein specified.

ALFRED T. STURDEVANT.

Witnesses:
HENRY T. BROWN,
FRED. HAYNES.